May 19, 1925. 1,538,781
G. BAEHR
VEHICLE BODY
Filed Jan. 27, 1922 6 Sheets-Sheet 1
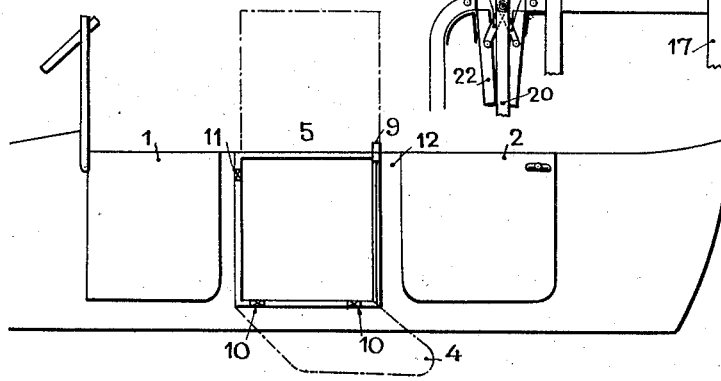
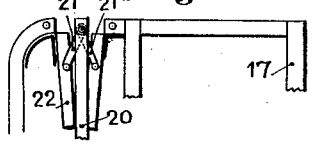
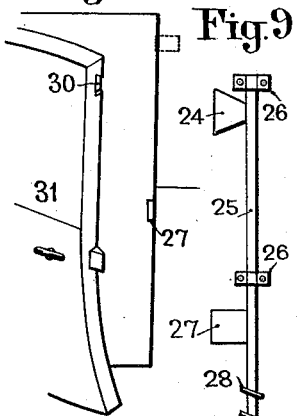
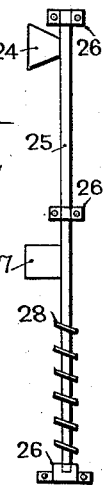
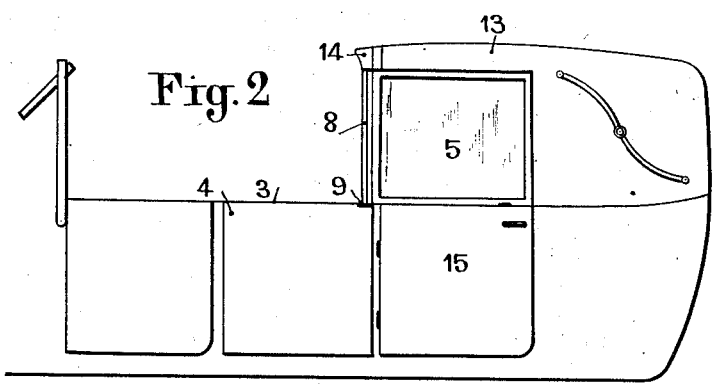
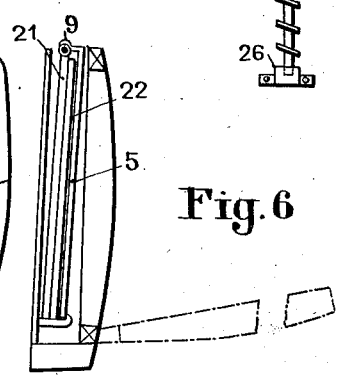
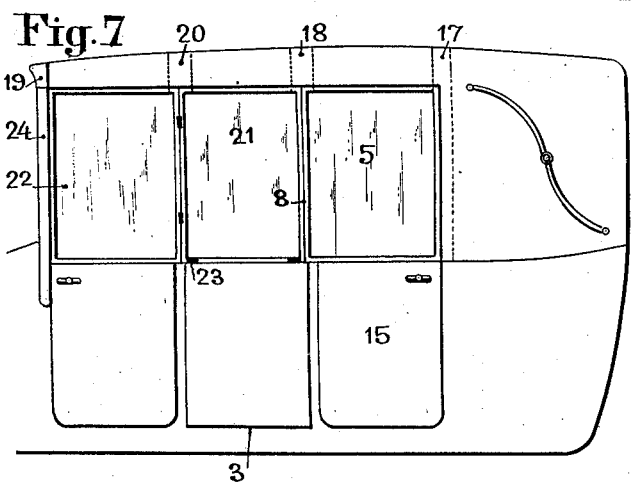
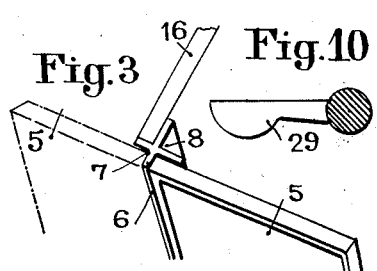
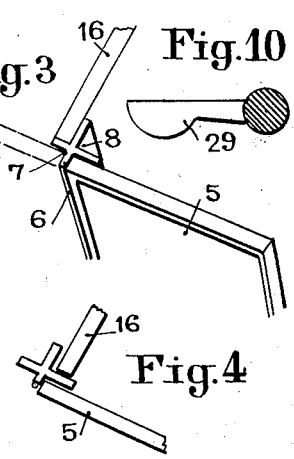
INVENTOR
GUSTAVE BAEHR,
BY
ATTORNEYS May 19, 1925.                                                1,538,781
G. BAEHR
VEHICLE BODY
Filed Jan. 27, 1922          6 Sheets-Sheet 2
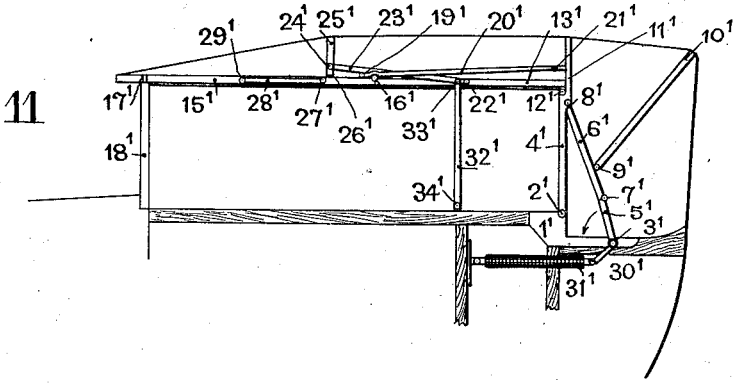
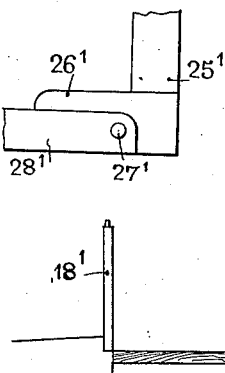
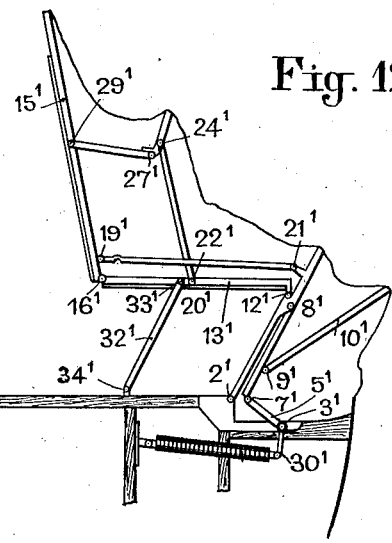
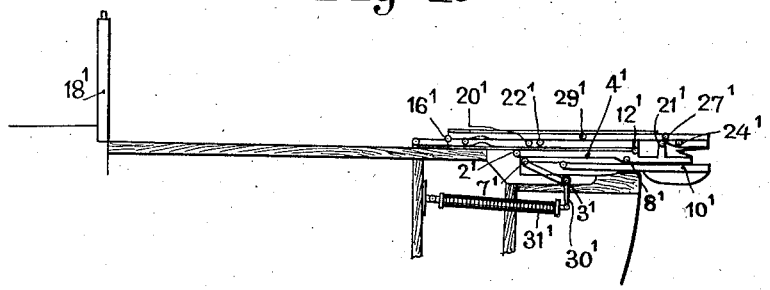
INVENTOR
GUSTAVE BAEHR
BY
ATTORNEYS

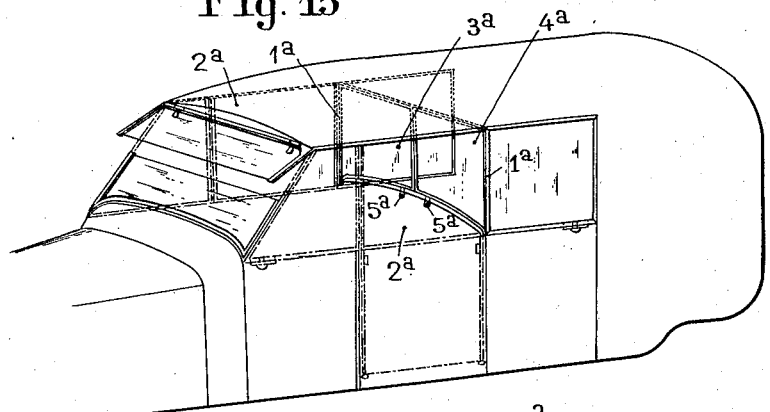
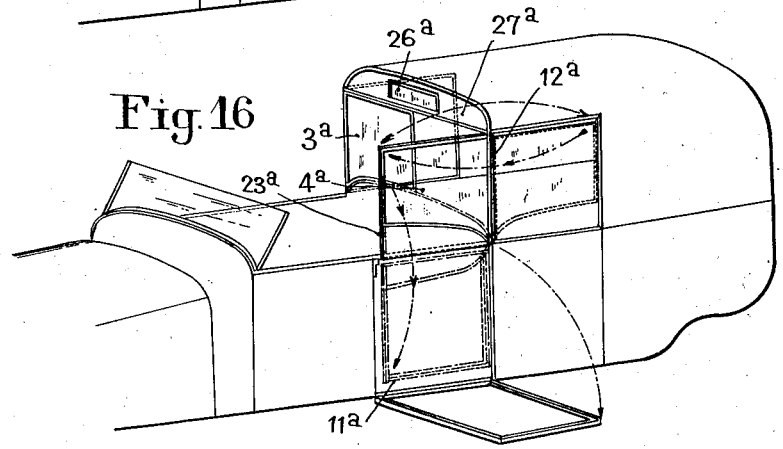
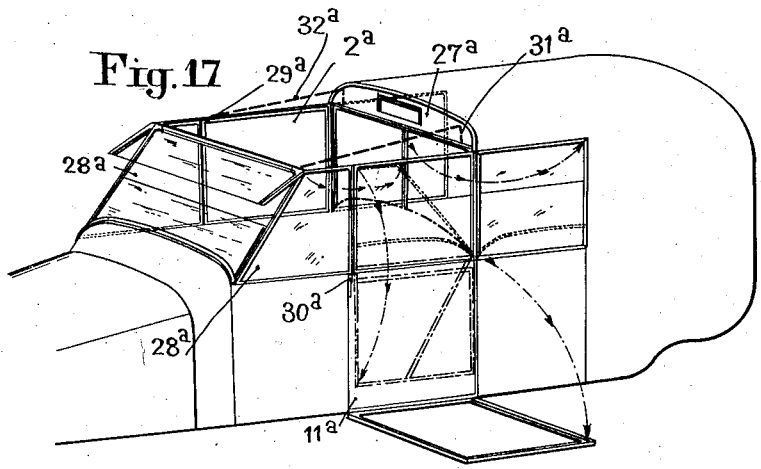

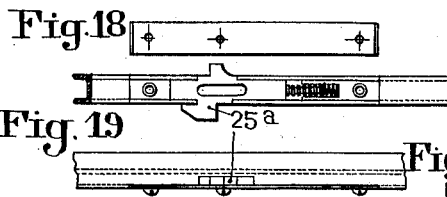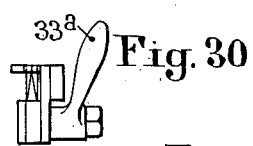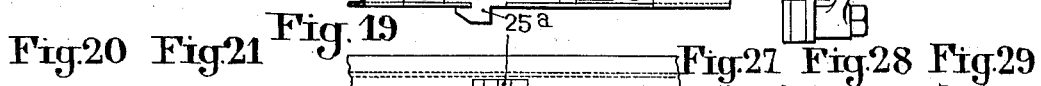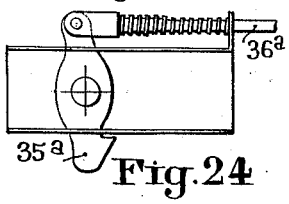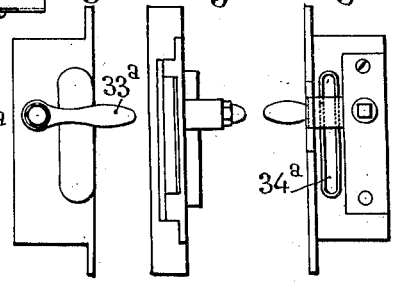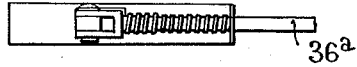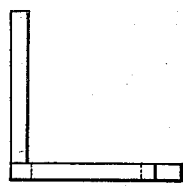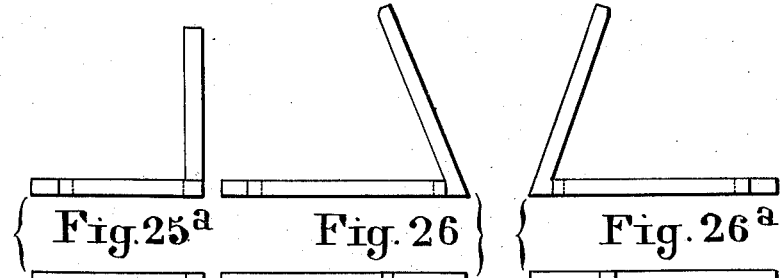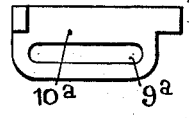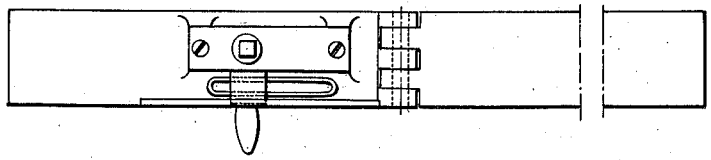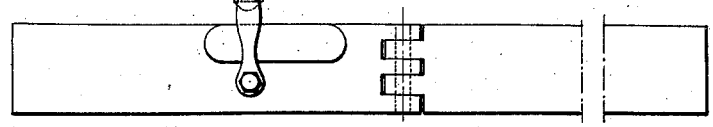

May 19, 1925. 1,538,781
G. BAEHR
VEHICLE BODY
Filed Jan. 27, 1922 6 Sheets-Sheet 5
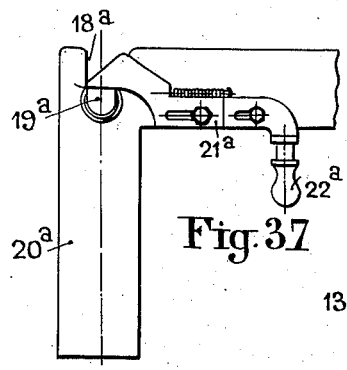
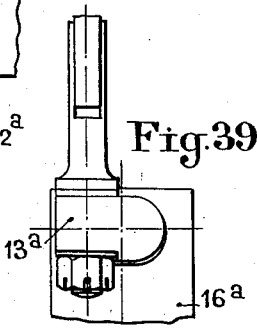
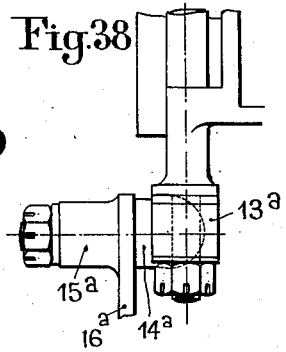
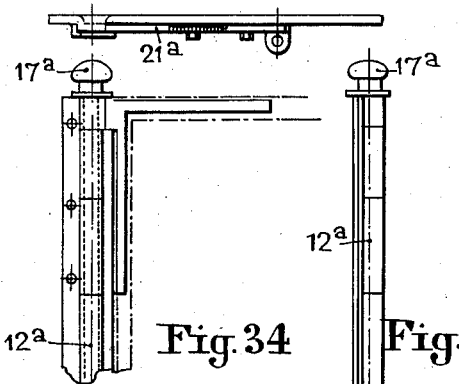
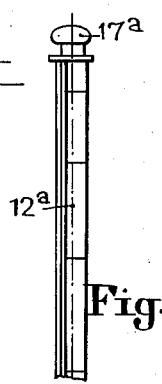
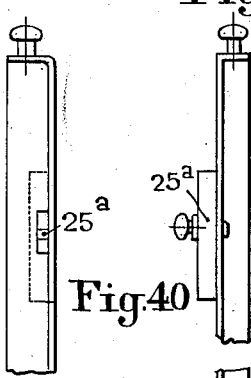
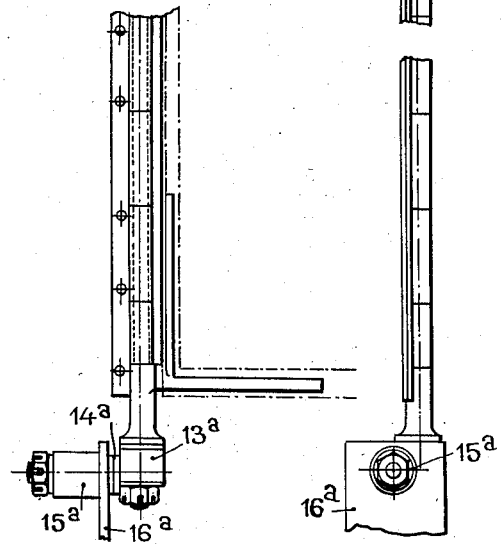
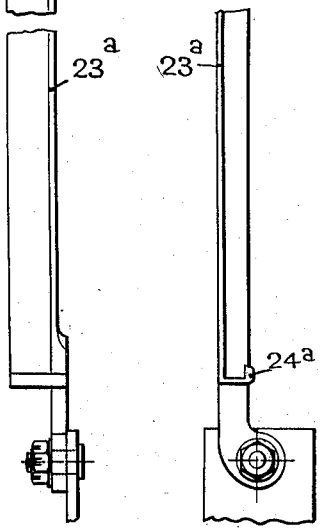
INVENTOR
GUSTAVE BAEHR
BY
ATTORNEYS May 19, 1925.

G. BAEHR

VEHICLE BODY

Filed Jan. 27, 1922 6 Sheets-Sheet 6

1,538,781

INVENTOR
GUSTAVE BAEHR
BY
ATTORNEYS

Patented May 19, 1925.

1,538,781

UNITED STATES PATENT OFFICE.

GUSTAVE BAEHR, OF PARIS, FRANCE.

VEHICLE BODY.

Application filed January 27, 1922. Serial No. 532,177.

*To all whom it may concern:*

Be it known that I, GUSTAVE BAEHR, a citizen of the French Republic, and residing in Paris, France, 2 Rue des Sablons, have invented certain new and useful Improvements in and Relating to Vehicle Bodies, of which the following is a complete specification.

This invention relates to improvements in carriage-bodies for automobiles and other vehicles, and it has for its object more particularly to permit a rapid and easy transformation from an open carriage to a closed carriage and to ensure the holding in a suitable position of the movable members such as doors, in order to prevent any play of these members when in their closed position thus transforming the vehicle in running order into a rigid whole insensible to vibrations or to the jolts of the road.

A further object of the invention is to provide a top device with automatic control in which the folding up of the whole top may be automatically operated as soon as the said top is relieved, the several parts of the frame of the said top being connected with one another by means of pivoting parallelograms, A damping means or dashpot is provided upon a movable part of the top in order to prevent any sudden falling down of the parts of the said top when folding the same, and thus to render easier the automatical folding of the said parts.

In the accompanying drawings which form a part of the specification, and in which the same letters or signs of reference designate corresponding parts in all the views:

Figs. 1 and 2 are side views or elevations representing a so-called "cabriolet" carriage in uncovered position and in covered position respectively.

Fig. 3 is a view of a detail.

Fig. 4 shows an alternative arrangement relating to Fig. 3.

Figs. 5 and 6 are details of an arrangement adapted to allow the transformation of the cabriolet into a car with interior driving.

Fig. 7 is an elevation of this latter car.

Fig. 8 shows an arrangement for a door adapted to assure the rigidity of the door when in its closed position.

Figs. 9 and 10 are details of the door-fittings.

Fig. 11 is an elevation of a top device in its position for use.

Fig. 12 shows the same top while being folded up.

Fig. 13 represents the top frame completely folded up.

Fig. 14 is a detail.

Figs. 15, 16, 17 show perspective views of a vehicle for interior driving and provided with a window pane forming a wall between the driver's seat and the rear seats, a detail of construction of a cabriolet, and the transformation of the cabriolet of Fig. 16 into a car for interior driving, respectively.

Figs. 18 and 19 show an elevation and a plan of a device for keeping the glasses in position, respectively.

Figs. 20 to 22 are an elevation, a side view and an end view of a bolt for closing the doors.

Figs. 23 and 24 are an elevation and a plan respectively of a door locking means.

Figs. 25, 25$^a$ represent in elevation and in plan respectively a right member and a left member for the locking of the window panes.

Figs. 26, 26$^a$ are similar views of an angle piece.

Figs. 27 to 30 represent a rear elevation, a side view, a front elevation and an end view of a locking means of a window pane respectively.

Figs. 31 to 33 show a front elevation, a plan and a rear elevation of a hinge combined with a latch.

Fig. 34 is an elevation of a column forming a hinge for a window pane for a cabriolet.

Fig. 35 is a side view, and

Fig. 36 a plan of the same.

Fig. 37 is a detail view of the locking device of the top part of the column shown in Figs. 34 to 36.

Figs. 38 to 39 represent an elevation and a side view of a part of a pivot of the frame shown in Figs. 34 and 35.

Figs. 40 and 41 show an elevation and a side view respectively of the column holding the window frame.

Figure 42:
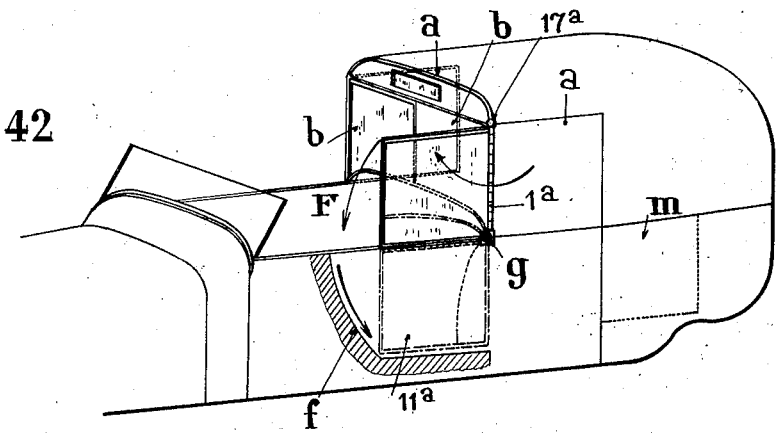

Fig. 42 is a diagrammatical view of a vehicle top showing the manner in which the window panes are hidden.

Figure 43:
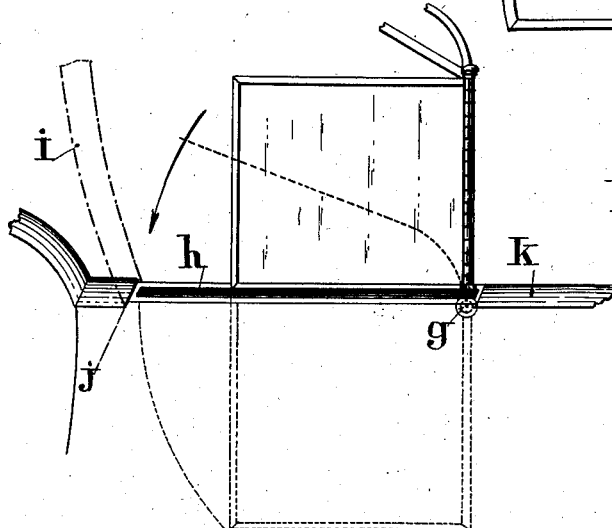

Fig. 43 is a detail view of a pocket provided with a panel hinged at its lower edge.

Figure 44:
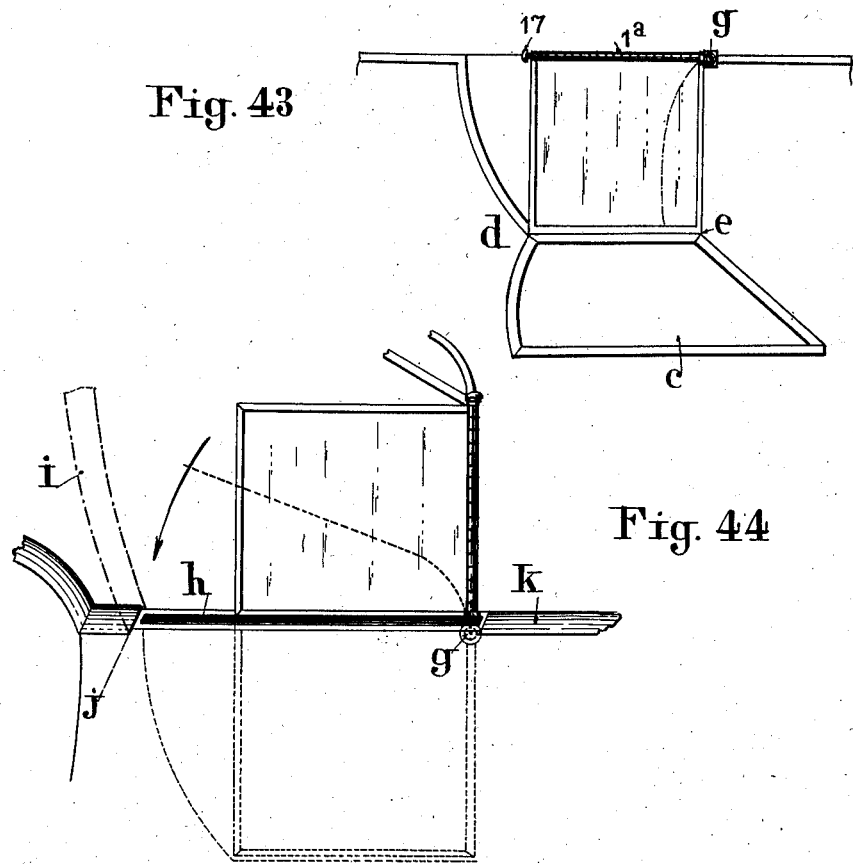

Fig. 44 shows a modification of the said pocket without a hinged panel.

In the carriage-body adapted to constitute sometimes a "carbriolet" sometimes a so called "torpedo" carriage, there are arranged on each side two doors 1, 2 between which there has been provided a pocket 3 formed by a panel 4 shown in closed position in Fig. 2 and in open position in Fig. 1. At the interior of this pocket is arranged a window adapted to close the rear portion of the cabriolet. This window 5 (Figs. 1 and 3 is provided on one of its edges with a hinge 6 (Figure 13) arranged on one of the wings 7 of a pillar 8, one of whose extremities is mounted by the intermediary of a hinge 9 (Figs. 1 and 2) at the edge of the carriage body and in the angle to the rear of the pocket 3. In the position for the uncovered carriage represented in Fig. 1, the window 5 is kept in the position of this figure, on the one hand by the joint 9 of the pillar 8, and on the other hand by some blocks or spring latches 10 provided under its interior face, as well as possibly by a block or latch 11 (Fig. 1) arranged in proximity to its upper edge.

The carriage comprises a movable top of known design which it is therefore unnecessary to describe in full. The window 12 separating the front seats from the rear seats also comprises a pocket, in which are disposed some jointed windows forming a "psyché" intended to constitute the upper portion of the separating partition in the case of the closed position of the carriage indicated in Fig. 2. The system of closing and of concealing these windows does not form part of the present invention and need not be described.

In order to pass from the "torpedo" form of Fig. 1 to the "cabriolet" form of Fig. 2, there is first of all folded a closing panel 4 of the pocket 3, this panel then coming to occupy the position represented in broken lines in Fig. 1. The window 5 is folded from bottom to top by making it pivot round the hinge arranged at the extremity of the pillar 8, thus leading this window into the position indicated in dotted lines in Fig. 1, then the top 13 being moved into the closing position of Fig. 2, the forward peak 14 of this top comes to engage with the upper extremity of the pillar 8, thus bolting this latter in position. The window 5 which until this moment occupied the position represented in dotted lines in Fig. 3, is then caused to turn around its hinge 6, in order to lead it into the position represented in full lines in this same Fig. 3, for which position it is then made solid with the rear door 15 whose hinges are arranged towards the front.

The closing of the cabriolet is completed by the displacement of the windows forming the upper part of the separating partition, each extreme window of this group of three windows coming to occupy the position indicated at 16 in Fig. 3 or in Fig. 4, thus bearing against one of the wings of the pillar 8 which thus constitutes a ledge for this window.

This arrangement may also be utilized so as to mount on the pillar 8, both the laterally closing window 5 and one, 16, of the windows forming the separating partition. In this case the window 16 will be mounted on the pillar 8 by the aid of a hinge analogous to the hinge 6, so as to permit the folding of the windows 5 and 16 the one against the other and their lodgment in the pocket 3. In this arrangement, it will then be sufficient, after having raised the group of the two windows 5 and 16 in the position indicated in dotted lines in Fig. 1, and after having fixed the upper extremity of the pillar 8 upon the forward peak 14 of the hood, to unfold the window 5 longitudinally towards the back and the window 16, transversely, the dimensions of the windows being suitably combined in order that these two windows 16 may properly close above the separating partition 12.

The window of the separating partition may be mounted on the common pivot so as to be capable of effecting a rotation around this pivot, permitting it to be brought in contact with the lateral window, either on the interior face, or on the exterior face of the latter, when it is desired to ventilate the interior of the carriage.

The common mounting may be constituted by a pillar of any desired section other than that represented; and even by a cylindrical column, solid or hollow, and the hinges of the windows may in this case be formed by ties or rings surrounding this column.

The carriage thus described may also be transformed into a carriage with interior driving as indicated in Fig. 7, by providing in this case in order to ensure the rigidity of the top, a rear cross-piece 17 adapted to be placed in a line with the rear extremity of each door, the cross piece 18 adapted to be fixed on the pillar 8, and between the peak 19 and this cross piece 18 a movable cross-piece 20 jointed at its extremity on the axis of connection of the two levers 21ª, themselves pivoted on the jointed uprights 22 of construction usual in the building of tops. The top is thus rigidly stretched as indicated in Fig. 7 which permits of ensuring a good protection.

In order to allow this transformation the pocket 3 receives two superposed groups of windows, on the one hand the window 5 (eventually combined with the window 16) which can pivot at first around its hinge 9 as in Figs. 1 and 2 in order to be afterwards folded towards the back above the door 15, then a group of two windows 21—22 adapted to effect the closing of the forward part of the carriage. For this arrangement, the window 22 is connected to the window 21 by the aid of vertical hinges permitting it to be folded on this latter, and the window 21 is jointed by the aid of horizontal hinges 23 (Fig. 7) in line with the pocket 3, in which it can be lodged by simple folding towards the bottom. One of the edges of this window 21 is thus always pivotally connected with the upper part of the carriage-body.

The windows occupy respectively the positions represented in the section Fig. 6, the windows 21 and 22 being first folded in the pocket so as to be afterwards covered by the window 5. There will be arranged, if this is necessary, some hinges suitably askew in order to permit this window 5 to occupy the position indicated.

In order to permit this transformation, the door posts 24, of the forward breakage-preventer receive the peak 19 of the top and can constitute a ledge to receive the forward vertical edge of the window 22, while the rear vertical edge of the window 21 will be engaged between the wings of the pillar 8 which will constitute a ledge for this edge.

The lateral cross pieces of the forward top may be fixed on the upper portion of the breakage-preventer at the time of the transformation of the carriage into interior driving. They may be jointed to the supporting columns for the windows of carriage-doors in such a manner as to constitute a rigid frame, on which there will then be placed the covering fabric from the forward places by unrolling it.

In this arrangement of transformable carriage-body, each door 15 having in the closing position the additional weight of the corresponding window, it follows that, on account of the vibrations as well as the shocks and jolts, the door can have play in its lodgment in spite of the assembling devices generally used for opposing this movement of the door, which devices are incapable of preventing play from being produced.

In order to enable the doors to preserve a correctly closed position in spite of their already considerable weight, and the additional weight that they receive by reason of the arrangement of the movable windows, there is arranged on the exterior edge of each door-framing, an automatic bolt adapted to fix the door in position and comprising (Fig. 9) a dove-tail lug 24 solid with a vertical axis 25 of suitable strength, held in bearings or lugs 26 fixed to the body of the carriage and having an actuating cam 27 adapted to be operated by the exterior edge of the door itself. A return spring 28 tends constantly to bring the members into the concealed position.

For the open position of the door (Fig. 8) the lug 24 is concealed in a lodgment made in the carriage-body, while the extreme edge of the cam 27 is in slight projection. When the door is closed, this door acting on the edge of the cam 27, is at first displaced slowly by reason of its action on a point close to its extremity, then it comes in contact with a boss 29 of this cam, thus precipitating the rotation of the latter, which moves the lug 24 into a lodgment of the same form 30 provided in the edge of the door 31 and suitably fitted, the adjusting of the lug 24 in its lodgment 30 being capable of a relatively great precision, there results from this that the door is held on the one hand by its hinges which allow no play, and on the other hand by the lug 24 adjusted in its lodgment 30, which lug is kept applied in this lodgment by the pressure exercised by the door itself on the cam 29, so that the door is thus bolted automatically in closed position, without it being possible for it to have any play and to displace itself with regard to its framing under the effects of the shocks and jolts of the road, as well as vibrations of the motor.

This arrangement for closing can be applied equally well to doors of small height used for the "torpedo" carriage bodies, as to doors of great height entering into the construction of closed carriages, so called "limousine" or others.

The collapsible top which permits the body to be transformed into either a closed or an open body comprises, as shown in Figs. 11 to 13, a frame 1' secured on the body of the vehicle, and carrying the bolts 2', 3' which constitute the pivots of the rear pillar 4' and the rear stretching device, the latter comprising parts 5' and 6', the upper part 6' being connected with the rear pillar 4' through the pivot 8'. The upper part 6' of the said stretching device carries the pivot 9' of the rear hoop-like member 10'.

The upper part of the pillar 4' has a recess 11' in which is provided the rear lever or bar 13' connected with the front bar or lever 15' through a hinge 16' enabling the bars to be brought in alignment with each other for the operating position shown in Fig. 11. Provided in the front bar 15' is a recess 17' which may be brought upon a bolt forming the upper part of the front pillar 18'.

Arranged on the front bar 15' in a convenient place of its length is a pivot 19' for the one end of a connecting rod 20' the other end of which is pivoted upon a pin 21' preserved on the upper part of the rear pillar 4'. Connected on a convenient point 22' of the rear bar 13' is a rod 23' the other end of which is connected with a pin 24' provided on the lower part of an intermediate hoop-like member 25' which part, provided with a heel portion 26' (Fig. 14) is pivoted on the pin 27' of a rod 28', which latter is pivoted on a pin 29' of the front bar 15'.

It is to be understood that the arrangement which has just been described is provided on either side of the vehicle, the top being connected on both sides of the vehicle, and a top is arranged for connecting the pillars 4' provided on either side of the vehicle, while a transverse spring is provided for connecting the front bars 15'.

Provided upon every lower part of the stretching device 5' is a bent lever 30' connected with one end of a coiled spring 31' the other end of which is secured on a fixed point of the vehicle body. An upright supplementary carrier 32' is pivoted upon the rear bar 13' on the pin 33', as well as on the body on a pin 24'.

The top frame being displayed as shown in Fig. 11, when it is desired to fold the same up into the rear of the body for uncovering the carriage, a key is introduced into the square hole of the pin 3', then the latter is acted upon in the direction of the arrow in Fig. 11, for starting the folding up of the stretching devices 5', 6'. The top frame is then raised at its front end, thus raising the front bars 15' from the front pillars 18'. The said raising of the top causes the end of front bars 15' to pivot round their pins 16', so that the front part 15' of the frame will be folded upon the rear part 13'. The rotation takes place on the one hand around the pins 16' of the front bars, and on the other hand around pins 2', 12', 33', 34' for a first parallelogram, 12', 16', 19', 21' for a second parallelogram and 22', 16', 29', 27', 24' for a third parallelogram. The connecting pieces being conveniently arranged on the lateral sides of the front bars 15' and of the rear bars 16' the said bars will rest flat, directly one upon the other, and for the folded up position, the rear bars 13' will be carried directly on the upper edge of the car body, while the rear pillars 4' are positioned in a horizontal recess of the said body.

During the folding of the said top, the lever 30', which is solid with every lower part of the stretching device acts upon the spring 31' which thus prevents the whole top from being too briskly brought into the folded position.

The several parts then are slowly brought into their folded position as shown in Fig. 13, which renders easier the convenient folding up of the whole body top, and prevents any shock, thus ensuring the keeping of all the parts in a good state of repair.

In the folded up position, the pin 9' of the rear hoop like member 10' is brought towards the front end of the carriage at the time of the folding up of the upper part of the stretching device, which reduces in a noticeable way the height of the said parts once folded up.

For covering the carriage, the front bars are pulled towards the front part of the vehicle and brought into the position shown in Fig. 11, their recesses 17' being then engaged with the upper ends of the front pillars 18'. The several joints play in the manner pointed out for the folding up of the parts, the said play being allowed by the provision of the three pliable parallelograms as mentioned hereabove.

The several parts of the frame may be made of any convenient substance, it is however preferred to make the frames 1' of aluminium, the rear pillars and bars 4' and 13', as well as the front bars 15', the lower part of the front pillars 18', being also made of aluminium. The following pieces will be made preferably of wrought iron: the rear stretching devices 5', 6', the levers 32' and the heeled angle levers 26' of the intermediate hoop 25'. The following pieces will be made of flat iron the branch 10' of the rear hoop, the connecting rod 20' of the front bar, and the connecting rods 23' and 28' of the intermediate hoop 25'.

The dimensions of the several pieces will vary according to the dimensions of the carriage to be covered. The coiled spring 31' can be substituted for a blade spring or a convenient dash-pot.

The vehicle top shown in Fig. 15 comprises a transverse wall which is arranged in the following manner:

Every pillar $1^a$ of the two central window panes $2^a$ is provided on either side of the carriage with a hinge which carries each glass frame intended to receive the wall glass $3^a$, $4^a$. As shown in Fig. 15, the lower frames of the said glasses presenting the shape of the wall upon which they are arranged and which constitutes for instance the back of the front seats on the transverse wall of the body. At the upper part of the said wall is provided under every glass $3^a$ and $4^a$, a locking latch $5^a$, which comprises, as shown in Figs. 20 to 22 a hook $6^a$ provided with a handle $7^a$ with a spring $8^a$, the hook having preferably a convenient length for engaging a notch $9^a$ of a part $10^a$ (Figs. 25 and $25^a$ of the glass frame).

The said glasses $3^a$ and $4^a$ are thus allowed to occupy the position shown in Fig. 15 and be locked in the said position by the latches of Figs. 20 to 25; they may also be folded upon the central glasses $2^a$ in the longitudinal direction of the carriage in the resting position.

When the top has been brought into the position of Fig. 15, the separating glasses $3^a$, $4^a$ are brought into the position of the said figure so that at that time the lateral glasses of the body are strongly maintained by the transverse glasses 3ª and 4ª, and they are not allowed to fold themselves.

When the length of the body is greater than the total length of the two separating glasses 3ª and 4ª, the length of which is limited by the pocket which has to receive the said glasses, a third frame is provided, the said third frame having a convenient width for filling up the empty part of the transverse wall. The said third frame may be pivoted upon one of the transverse glass frames by means of a hinge, the said frame may also be hinged upon a horizontal shaft solid with the transverse wall or with the front seats back.

In the body shown in Figs. 15 or 16 and 17, on either side of the carriage is provided between the two doors a pocket 11ª, as described in my Patent No. 1,463,030, July 24, 1923. In the said pocket are folded the lateral side glasses together with the corresponding transverse glass.

In the arrangement of Fig. 16 which is more particularly designed for a cabriolet with folding body, the necessary glasses having to be brought in front of the rear side of the front seats, the same are pivoted on a pillar 12ª (Figs. 34 and 35) which is pivoted by its lower part 13ª (Figs. 34, 38 and 39) on a shaft 14ª which latter may pivot in a horizontal sleeve 15ª, solid with a bracket 16ª (Fig. 34) secured on the edge of the body.

The pillar 12ª is provided, at its upper part, with an expanding part or head 17ª which may enter through a channel 18ª (Fig. 37) into a recess 19ª provided in an angle bar 20ª of the upper part of the body, a spring latch 21ª being provided for automatically maintaining the head 17ª in the closed position. The latch 21ª comprises a handle 22ª for drawing back the said head.

An intermediate pillar 23ª (Figs. 40, 41) comprises an angle iron provided at its lower part with a hook 24ª (Fig. 41) which, when oscillating the pillar, receives the lower part of the frame under the angle opposed to the pillar.

The said frame is maintained on the pillar by a lock 25ª, shown more in detail in Figs. 18 and 19 and which thus renders the glass frames solid with the said pillar 23ª during its displacements.

It is to be noticed that the head 17ª of the pillar 12ª is preferably screwed upon the said pillar so that it is possible to tighten the closure of the said head into its recess.

The arrangement which has just been described for the pillar which constitutes an axis for the glasses enables the said pillar to be maintained without any clearance, thus avoiding any vibration of the whole part. Any clearance may, besides, be avoided by screwing up the head 17ª so that the several parts are always in a good state of repair.

The provision of the intermediate pillar 23ª enables the glasses of one lateral side to be folded when the latter, once freed from the top are carried only by the pillar 12ª, the foot of which has a double pivot and hence does not sufficiently support the glasses. When not in use, the said intermediate pillar is folded down into the pocket 11ª and can be brought into the active position of Fig. 16 when the glasses are to be folded or unfolded.

In this arrangement of a closed body, the ventilation of the body inside may be obtained through a wind screen 26ª the opening of which may be regulated, and provided with a convenient controlling means and which is to be placed preferably in the middle of the rigid front part 27ª of the body, above the partition glasses 3ª, 4ª.

It is to be understood that the ventilation of the body could be effected, either through the said wind screen 26ª only, or through the front or side glasses.

For the cabriolet which may be transformed into a car with internal drive shown in Fig. 17, the arrangement after Fig. 16 is used, while providing in front of every central glass 2ª, a supplementary glass 28ª connected with the said central glass by means of a hinge 29ª. The angle iron of the lower part of the frame of each of the glasses 28ª comprises two pivots pivoted upon brackets 30ª of the bottom of the pocket 11ª and under the rear glasses in order to permit the folding down of the said glasses 28ª.

The front seats may be covered with a fabric resting upon a frame comprising bars 31ª of wood or metal or any convenient substance, the said bars being either rigid or articulated. Every bar may also be provided on its rear end with a pin engaging a bracket mounted on the part 27ª of the cabriolet top, and comprising at its front end a vertical perforation with a locking device enabling the same to be secured upon the end of the wind screen, the said frame then assuming the position shown in 32ª for receiving the covering substance of any character.

The bars 32ª being mounted in their places, and the rear glass being closed, the front glass will be in a position to be raised and thus occupy and close the lateral opening, as in the case of a torpedo carriage transformable into an internal drive carriage.

The brackets shown in Figs. 25, 25ª will assume the shape shown in Figs. 26, 26ª for the particularly shaped glasses such as 28ª.

For the locking of the upper edge of the glasses there will be used a latch with an angle bar as shown in Figs. 27 to 30, comprising a controlling handle 33ª depressing an india-rubber or any other substance lining, such as 34ª, for the bracket 9ª of Figs. 25 and 26.

The said bracket may be combined with a hinge as shown by example in Figs. 31 to 33.

A locking device may be constituted by a spring latch comprising a beak 35ª pivoted in its middle and receiving a controlling rod 36ª as shown in Figs. 23 and 24.

When the invention is applied to a cabriolet (Fig. 42) the glasses a, b forming a group of closing panes on the one side of the said cabriolet and capable of being folded upon each other, or unfolded for the position of use around the common pivot 1ª, the said glasses may be mounted, as in the case of Figs. 15 to 17 through hinges upon the said pivot which is provided, at its upper end with a head 17ª which enters an automatic locking device provided in the bracket which keeps the front part 27ª. This device however does not comprise a lateral or side recess for the said head 17ª, the said entrance being provided in the front end parallel with the longitudinal axis of the carriage so that the folding down of the device may take place in the direction of the arrow F in Fig. 42 or in a direction contrary to the said arrow in a plan parallel to the longitudinal axis of the vehicle.

The group of glasses may be folded down into a pocket 11ª, provided with a lateral closing door c which may pivot around a horizontal spindle d, e of any arrangement, convenient retaining devices being provided for keeping the said door c in a convenient position.

The said pocket, however, instead of being given a rectangular shape slightly greater than the dimension of the glasses has in its front part a curved edge f which permits the passage of the extreme corner of the glasses. In this arrangement the lower spindle g of the hinge 1ª is horizontal and directed transversely to the vehicle, the head 17ª, for the position of rest of Fig. 43 resting upon a carrying part such as a bracket of any character and shape.

A pocket could also, as shown in Fig. 44 be provided in the wall of the body without a side door, the said pocket being closed by a part i movable around a hinge j of the usual band k, which is secured on the upper edge of the body. The spindle g is then arranged inside the pocket h, the handling of the glasses taking place in the manner described.

Such closing of the pocket could be obtained in any other convenient way, as for instance by means of a sliding curtain or such a curtain with a rigid mounting, or by a part of band k hinged by one end as shown in chain lines in Fig. 44 or upon the body for permitting its folding in the lateral direction.

The pocket h may be provided in the parting wall provided between the front and the rear seats, the said pocket then being allowed to occupy the whole width of the carriage for receiving the two similar groups of glasses a, b; in such a case, the said pocket will be given a sufficient width enabling the same to receive the two groups of glasses; it is also possible of providing two separated pockets arranged side by side, each receiving a group of glasses.

The pocket provided in the parting wall may have its openings on its upper part, so as to enable the glasses to be folded down on pivoting around the conveniently directed spindle g. For that purpose, the glass a being folded upon the glass b in the closing position of the latter, the oscillating spindle 1ª of the said glasses being free, it would be sufficient of inclining the spindle 1ª towards the inside of the carriage for making the group of two glasses disappear into the pocket.

The opening of the said pocket may be arranged vertically in the said back so as to disengage the said pocket by the opening of the door. Then the glasses a, b would pivot around an axis parallel with the longitudinal axis of the carriage and be folded towards the outside for coming into the pocket through the lateral opening which then would be closed by the closed door.

The pocket could also be arranged in the rear part of the body, for instance as shown in dotted lines in m in Fig. 42.

The two glasses a, b forming each group could be arranged in a completely removable way and located in non use position in a pocket or any convenient place provided in the corresponding door or in any part of the vehicle.

What I claim is:

1. In an automobile or other vehicle, the combination with a body provided with a hinged door and a pocket in the side of the body in front of the door, and an extensible top for the body, of a pillar provided with wings and pivoted at one end to the body at the upper rear edge of the pocket to fold into the pocket or swing in an upright position in engagement with the top when extended, means for locking the upper end of the upright to the front of the top, and a window, pivotally mounted on one of the wings of the pillar to swing about the same and above the door when said pillar is in an upright position.

2. In an automobile or other vehicle, the combination with a body provided with a hinged door and a pocket in the side of the body in front of the door, and an extensible top for the body, of a pillar provided with wings and hinged to the body at the upper rear edge of the pocket to fold into the pocket or swing into an upright position in engagement with the top when extended, a window hinged to one of the wings of the pillar to fold with the pillar into the pocket or to swing about the pillar and above the door when the pillar is in an upright position, a transverse partition, and a second window hinged to another wing of the pillar to swing above the transverse partition or to fold upon the first window into said pocket.

3. In an automobile or other vehicle, the combination with a body provided with a hinged door and with a pocket in the side forward of the door, and an extensible top for the body, of a winged pillar, pivoted to the body at the upper rear edge of the pocket to fold into the pocket, the pillar when in an upright position and the top extended engaging said top, a window hinged to a wing of the pillar to swing about the same and above the door and adapted to fold with the pillar in the pocket, and two windows hinged together to fold one upon the other, one of the said windows being hinged at its lower edge to the body in line with the pocket so that the said windows can be extended in alinement with each other and with the first window when it is above the door, or folded and swung into the pocket upon the said first window.

4. In an automobile or other vehicle, the combination with a body provided with a door, a pocket forward of the door, and a front port and an extensible top for the body, of a hinged pillar for supporting the top when extended, said pillar being provided with wings and adapted to fold in the pocket when not in use, a window pivoted to a wing of the pillar to swing about the same and above the door, said window folding with the pillar when not in use into the pocket, and two windows hinged together to extend into alinement with each other or to fold one upon the other, one of the said windows being hinged at its lower end to the body in line with the pocket, whereby the said windows can be extended in alinement with each other and with the first window when it is above the door with one window engaging the said post and the other a wing of the pillar, or folded one upon the other and swung into the pocket.

5. In an automobile or other vehicle, the combination with a body provided with two spaced doors, a pocket between the doors, a post at the front of the body, and an extensible top adapted to be supported by the post when extended, of a winged pillar pivoted to the body at the rear of the pocket and adapted to fold into said pocket when not in use, a window pivotally mounted on a wing of the pillar to swing into the pocket with the pillar or to swing above the rear door when the pillar is in upright position, and two windows hinged together to fold one upon the other or to extend in alinement with each other between the pillar and post, one in engagement with the pillar and the other with the post and supported thereby in alinement with the first window when it is above the door, one of said windows being hinged to the body in line with the pocket and said windows when folded one upon the other being adapted to fold into said pocket.

6. In an automobile or other vehicle, the combination with a body provided with a door and a pocket at one side of the door, and an extensible top for the body, of a pillar pivoted at its lower end to fold into the pocket or swing into an upright position into engagement with the top when extended to support the same, and two windows hinged to the pillar, one to swing above the door and the other transversely of the body when the pillar is in an upright position and both to fold with the pillar into the pocket one upon the other.

In testimony I have hereunto set my hand at Paris (France), this 10th day of January 1922.

GUSTAVE BAEHR.